United States Patent Office 3,364,957
Patented Jan. 23, 1968

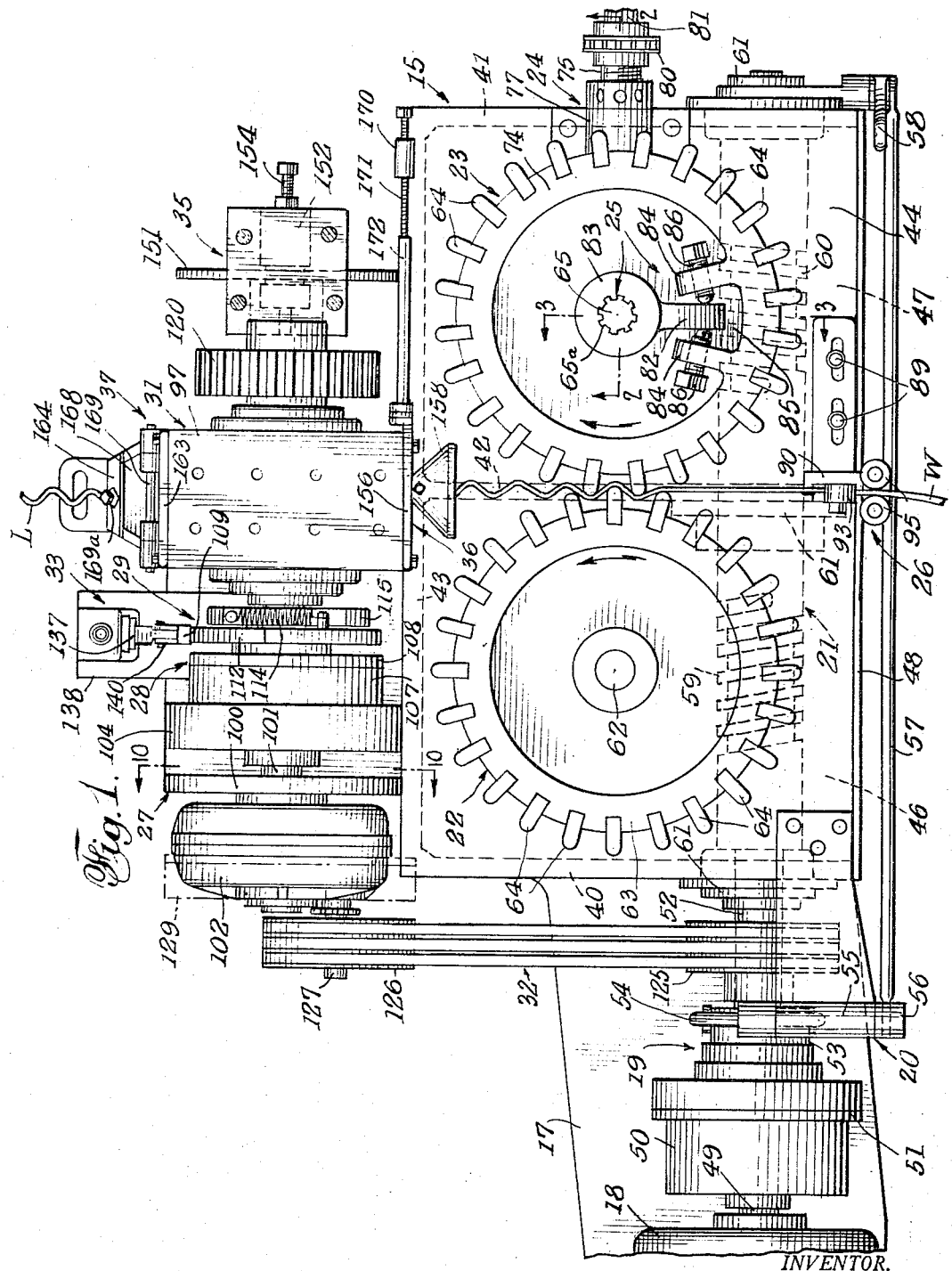

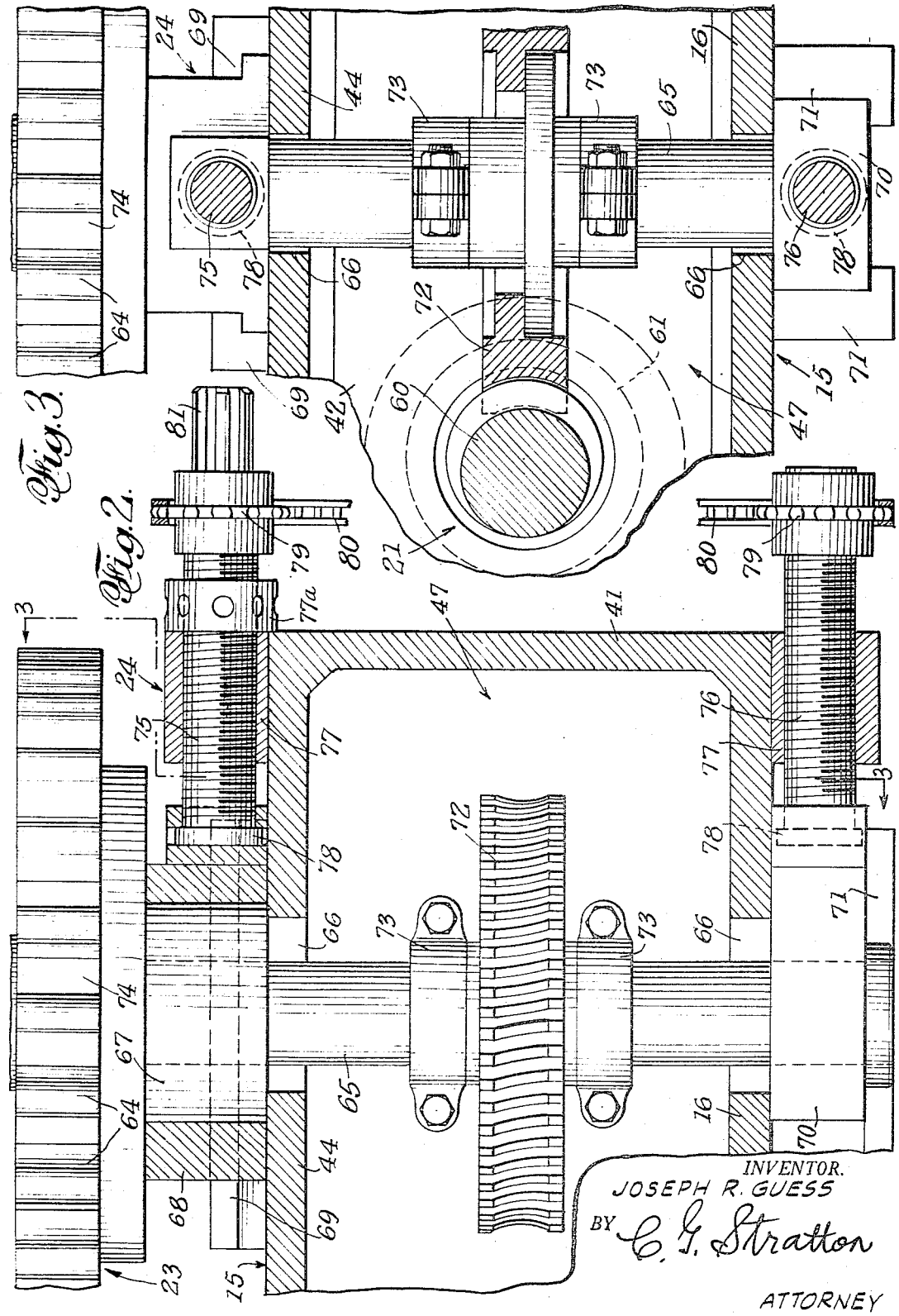

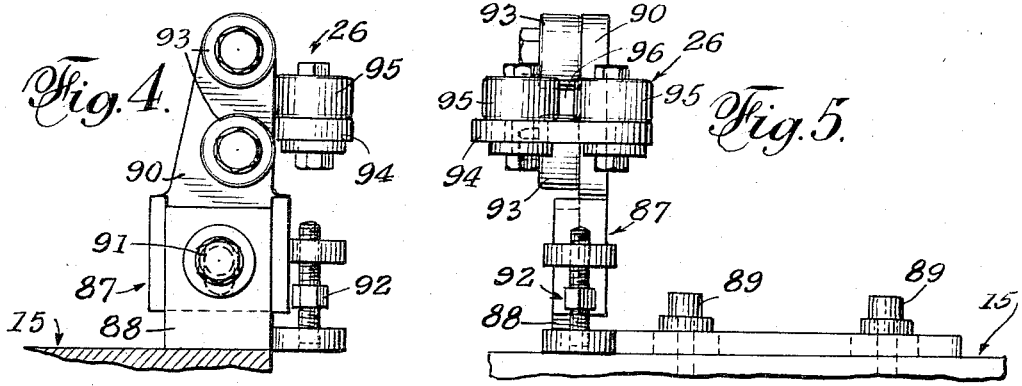
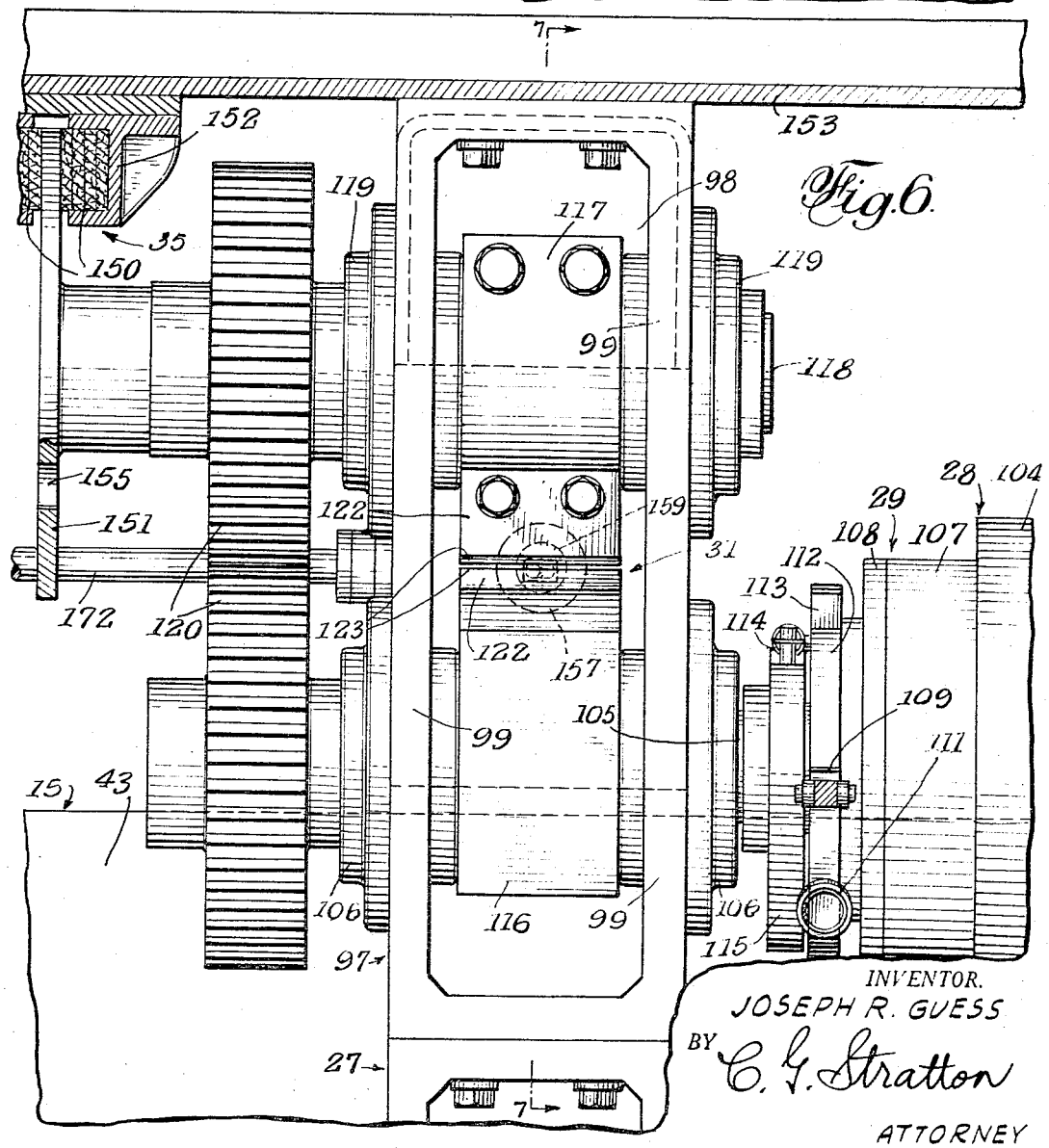

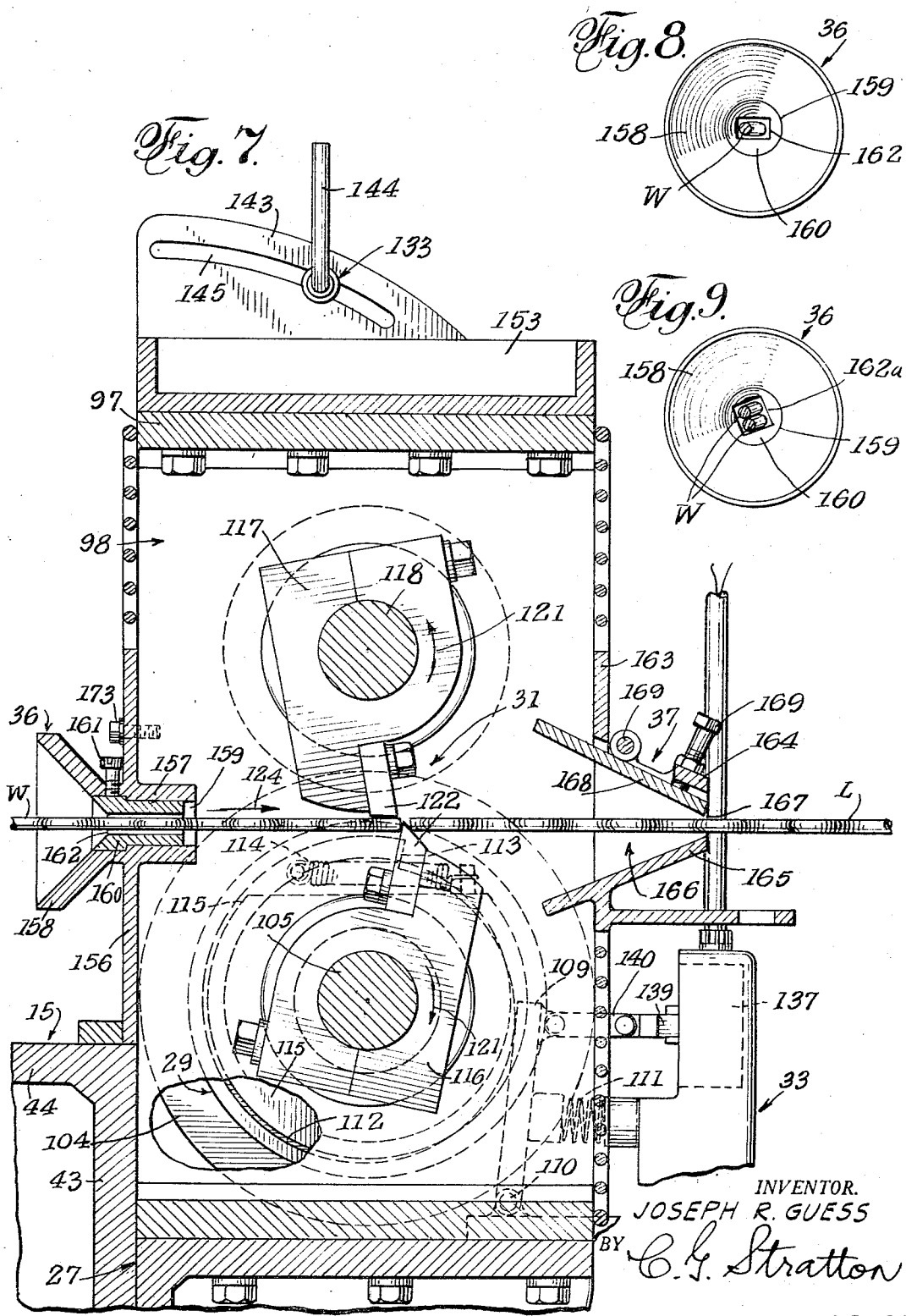

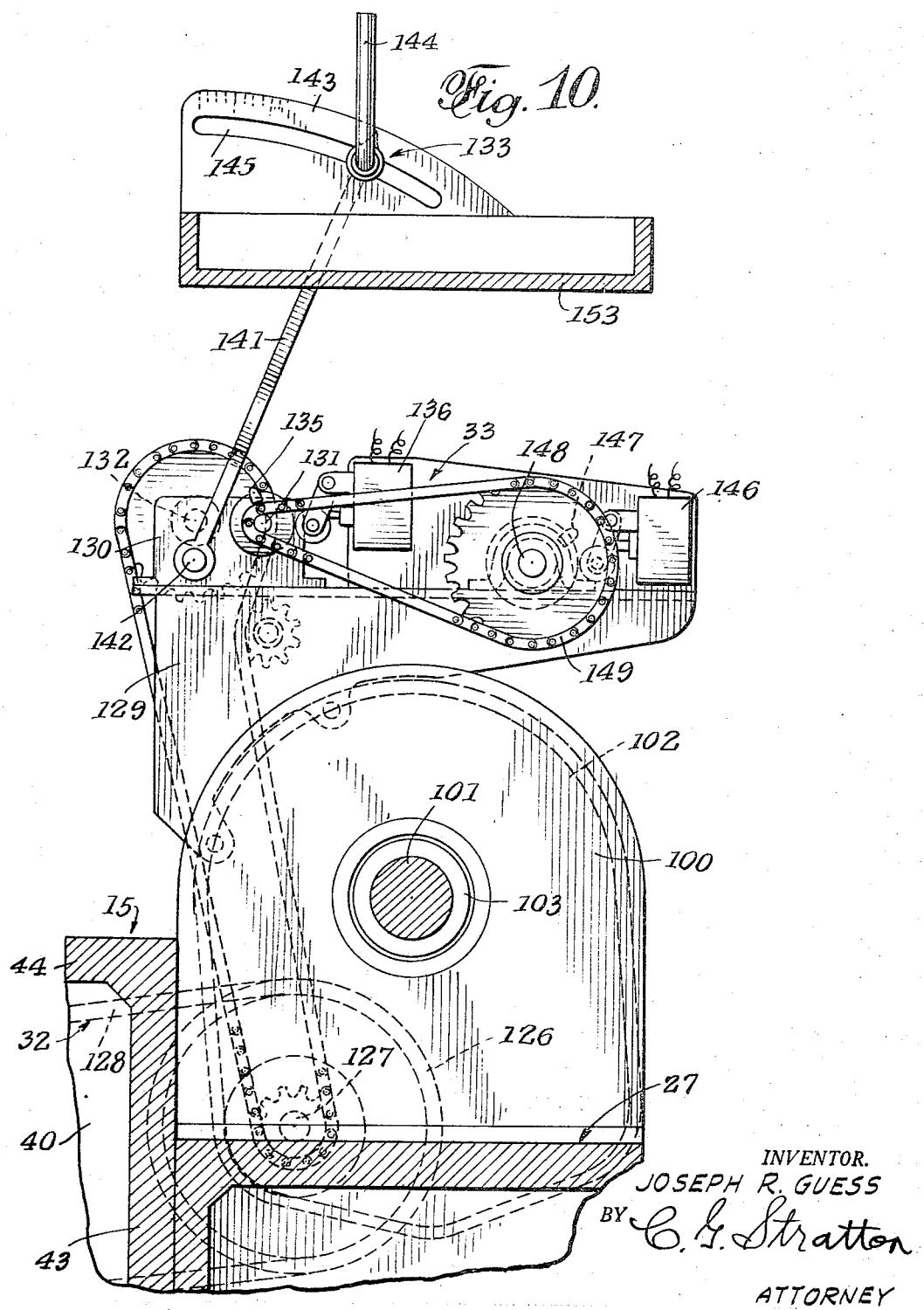

3,364,957
WIRE-CRIMPING MACHINE
Joseph R. Guess, 904 W. Huntington Drive,
Arcadia, Calif. 91006
Filed Aug. 23, 1965, Ser. No. 481,665
9 Claims. (Cl. 140—105)

ABSTRACT OF THE DISCLOSURE

A wire-crimping machine having two crimping rolls one of which is adjustable relative to the other to vary the depth of crimp in a wire, an angular adjustment to orient the crimping dies of said rolls, means to cut the crimped wire into uniform lengths provided with shearing dies that, when cutting, move in the same direction as the line of feed of the crimped wire, a one-revolution clutch controlling operation of the wire cutter means, and interconnected drive means for the automatic operation of the above components.

This invention relates to a machine for crimping wires, especially those that are adapted to be woven in screens.

An object of the present invention is to provide a wire-crimping machine that also cuts the crimped wire to desired lengths and which has a low, compact profile that affords ready access to the machine components for easy facility of maintenance and exchange of parts such as crimping rolls, for instance.

Another object of the invention is to provide a crimping machine, as above characterized, that embodies a continuous feed of one or more wires to be crimped with cut-off means activated to effect instantaneous cutting while the wire is so moving.

A further object of the invention is to provide a crimping machine, as above, that may feed two or more wires simultaneously while traveling paths one above the other, and shifting the wires, relatively, after the same have been crimped, so they may be cut to similar lengths between one-revolution cutting dies while so moving and being shifted.

A still further object of the invention is to provide a wire-crimper that effects crimping between continuously driven rolls, one of which is on a fixed axis and the other is transversely adjustable relative thereto according to the wire size and type of crimp.

A yet further object of the invention is to provide a crimping machine, as above characterized, that provides for rotationally adjusting the transversely adjusted roll so the crimping dies carried by the rolls are properly oriented with each other to obtain the form of crimp that is desired.

A yet further object of the invention is to provide means embodied in the drive for the wire-severing dies for timing the severing or cutting operations, as desired.

This invention also has for its objects to provide such means that are positive in operation, convenient in use, easily installed in a working position and easily disconnected therefrom, economical of manufacture, relatively simple, and of general superiority and serviceability.

The above objects are realized in a machine that has a hollow flat-topped base in which drive gearing for two horizontal crimping rolls on vertical axes are mounted. A clutch-controlled drive for said rolls is provided at one side of the machine; one of the rolls is carried by a fixed vertical shaft with the roll spaced above the base top. The other roll is carried by a vertical shaft that is transversely spaced from the mentioned fixed shaft, the latter shaft being mounted in vertically spaced bearing, with means being provided to adjust the transverse spacing of the two rolls by moving said other shaft relatively to the fixed shaft by simultaneous movement of the vertically spaced bearings of the latter shaft.

The dies which cut the crimped wire are driven off the shaft that continuously drives the crimping rolls, a one-revolution clutch being normally disengaged while the cutting dies are retained non-movable during feed of the wire to desired crimped length. Selective geared means are provided for effecting engagement of the latter clutch and operation of the cutting dies to cut the crimped wire to desired lengths while the same are being continuously fed by the crimping rolls.

The two crimping rolls may crimp a single length of wire or two or more lengths simultaneously, and feed the same to and between the cutting dies. When two or more wires are being crimped, before the point for cutting reaches the cutting dies, said wires are caused to shift so they will assume a coplanar position and be severed by the cutting dies while in such position.

Adjustable roller guides are located on the base top forwardly of where the wire is crimped so the same may be adjusted to iron out all or most of the curves or bends in the wire as it comes off a reel thereof disposed horizontally at the front of the machine from which it is spaced. Such reels of wire are normally mounted on rotating supports from which the reels thereon are unwound.

The invention also comprises novel details of construction and novel combinations and arrangements of parts, which will more fully appear in the course of the following description, which is based on the accompanying drawings. However, said drawings merely show, and the following description merely describes, one embodiment of the present invention, which is given by way of illustration or example only.

In the drawings, like reference characters designate similar parts in the several views.

FIG. 1 is a top plan view of a wire-crimping machine according to the present invention, a detail-obscuring tray being omitted.

FIGS. 2 and 3 are enlarged broken cross-sectional views taken on the respective lines 2—2 and 3—3 of FIG. 1.

FIG. 4 is a side view of wire-straightening means.

FIG. 5 is a front view of said straightening means.

FIG. 6 is a fragmentary rear view showing the cutting dies of the machine as well as a portion of the drive means therefor.

FIG. 7 is a vertical sectional view as taken on the line 7—7 of FIG. 6.

FIG. 8 is a front view of guide means for a single crimped wire as viewed from the left side of FIG. 7.

FIG. 9 is a similar view of a modification for guiding two crimped wires.

FIG. 10 is a cross-sectional view, as taken on the plane of line 10—10 of FIG. 1 and drawn to the scale of FIGS. 2 to 9.

The wire crimper that is illustrated comprises, generally, a hollow base 15 of parallelepiped form, the same being mounted on feet or support brackets (not shown) that space the bottom wall of said base from the floor; a lateral extension 17 of one of such brackets mounts an electric motor 18 or other prime mover; a crimper drive 19, including a manually operated clutch shift 20 for effecting driving rotation of a worm shaft 21 housed in the hollow of said base 15; a crimping unit 22 on a fixed vertical axis driven by the shaft 21 and mounted in said base 15; a second crimping unit 23 on a transversely adjustable vertical axis driven by the shaft 21 in the opposite direction and at the same speed as the first unit 22; means 24 to adjust the latter unit and lock the same, as adjusted; means 25 to angularly adjust the unit 23 to bring it into orientation with the unit 22 for forming crimps in a wire or wires W fed to the machine; adjustable wire-guiding means 26 mounted on the forward portion of the base to guide a wire or wires to the path along which crimping takes place; a mounting bracket 27 mounted on the rear of the base; a cutter drive 28 mounted on the latter bracket and including a one-revolution positive-action roller clutch 29 for effecting driving one-revolution operation of wire-cutter means 31 for shear cutting to length the wire or wires fed thereto by the crimping units 22 and 23; a driving connection 32 from the shaft 21 to the cutter drive 28; means 33 for releasing the clutch 29 to cause operation of the cutter means 31; a drive 34 connecting the said means 33 with the driving connection 32; brake means 35 to arrest the clutch-released operation of the cutter means after each wire-severing operation; guide means 36 for the crimped wires disposed between the crimping units 22 and 23 and the cutter means 31; and wire-holding guide means 37 for loosely engaging the severed wires after cut-off.

The base 15 is provided with end walls 40 and 41, an intermediate partition wall 42, a rear wall 43, and top and bottom walls 44 and 45, respectively. These walls define two side-by-side interior spaces that are closed by a front plate 48. The top wall, in practice, is lower than normal table height, about twenty-four inches in this case, so as to provide the machine with a low profile that affords ready visibility and access to parts and components mounted thereon.

The electric motor 18 is of suitable power to drive the operating components which crimp the wire or wires W and cut the same to equal lengths after crimping. The same has a drive shaft 49 that extends horizontally toward the base 15.

The crimper drive 19 comprises a flywheel 50 connected to the shaft 49, friction clutch plates 51 effecting a friction or similar clutch drive of a shaft extension 52 coaxial of the shaft 49, and the mentioned clutch shaft 20. Said shaft extension 52 is part of the worm shaft 21.

The clutch shaft 20 is shown as a spool 53 that is conventionally splined to the shaft extension 52 so the spool, as well as one of the clutch plates 51, is slidable along said splines by means of a yoke 54 that is movable on a rock shaft 55 by a lever 56, a link 57 extending from the end of said lever, and an operating lever 58 to which the link is connected. The drive 19 and the shift means 20 are generally typical of manual shift means for coupling and uncoupling the drive connection between the clutch plates 51.

The shaft 21 is shown with a worm 59, of one hand, cut therein or formed thereon in the portion extending across the base space 46, and with a worm 60 of the opposite hand in the portion of the shaft that extends across the space 47 of the base. Suitable bearings 61 mount the shaft 21 on the walls 40, 41 and 42 in said spaces 46 and 47. In this instance, said shaft is located nearer the plate 48 than the rear wall 43 of the base.

The crimping unit 22 comprises a vertical shaft 62 that extends through the base walls 44 and 45 and is mounted in suitable bearings (not shown) to rotate on a fixed axis. The upper end of said shaft 62 extends through the base top and is fitted with a crimping roll 63 which, preferably, is fitted with hardened die members 64 which extend radially from the periphery of said roll. Usually, said die members 64 are uniformly spaced over the circumference of the roll and have rounded wire-crimping outer ends. A worm gear, not shown but similar to the one later described for the crimping unit 23, is mounted on shaft 62 and is in mesh with the worm 59 so as to drive the roll 63 in a counter-clockwise direction.

The second crimping unit 23 comprises a vertical shaft 65 that extends through transverse slots 66 in the base walls 44 and 45. As best seen in FIGS. 2 and 3, the upper end of said shaft is provided with a bearing 67 above the base wall 44, the same being embodied in a slide 68 that is guided for sliding movement toward and from the crimping unit 22 in guideways 69. The lower end of shaft 65 is similarly mounted in a slide 70 that is engaged in guideways 71 that are aligned with the guideways 69.

A worm gear 72 is affixed to the shaft 65; it may be splined thereto and retained in place on the shaft by upper and lower clamps 73. Said gear is in mesh with the worm 60 which, because it is of the opposite hand to worm 59, drives the gear 72 and, therefore, the roll 74 clockwise. The crimping dies or teeth 64 on the roll 74 are interfitted with the teeth of the roll 63, the same, according to the overlap of the rounded ends of the teeth, crimping the wire W and, in the process, feeding the crimped wire in a direction toward the cutter means 31.

The means 24 (FIG. 2) is shown as studs 75 and 76 threadedly engaged in nut-like pillow blocks 77 mounted, one on the top wall and the other on the bottom wall of the base 15. The inner ends of said studs, respectively, have rotational connection 78 with the slides 68 and 70. Each stud 75 and 76 is provided, at its outer end, with a sprocket pinion 79, an endless chain 80 being trained over said pinions. A splined end 81 extends from the stud 75. A wrench applied to said splined end may be used to turn the stud 75, thereby causing the stud 76 to turn also and in the same direction. Thus, depending on the direction the wrench is turned, the two slides 68 and 70 are moved together, moving the roll 74 toward or from the roll 63, accordingly. The adjustment is locked by a nut 77a on the stud 75.

During each adjusting movement of the crimping unit 23, the worm gear 72 thereof will roll over the teeth of the worm 60. If said unit is restored to its original position after such movement, the die teeth 64 thereof will return to oriented relation to the die teeth of the wheel 63. Should the return setting be changed, as for deeper crimps or for wire diametrally larger or smaller, the teeth orientation may be readjusted by the means 25.

Said means 25 comprises a radial extension 82 on a collar 83 affixed to the shaft 65, a pair of lugs 84 formed on or affixed to the roll 74, which is freely rotationally fitted on said shaft, said lugs defining a bifurcation 85 into which said extension 82 extends, and adjustable stop screws 86 mounted on said lugs and directed toward the extension 82. It will be clear that the roll 74 may be adjusted rotationally on shaft 65 by manipulation of the screws 86 against the opposite faces of the extension to bring the die teeth of roll 74 into desired orientation with those of the roll 63. When drawn up tightly, said screws firmly lock the roll 74 on its shaft to turn therewith.

The above fine adjustment of the die roll 74 may be combined with a coarser or more general adjustment of said roll on shaft 65. A splined connection 65a between shaft 65 and collar 83 enables the latter to be coarsely adjusted angularly on the splines before the finer adjustment of the roll 74 is effected relative to the extension 82, as above. The coarser adjustment is useful in case where the crimping die teeth 64 are not of uniform size and spacing, as shown, but are formed to form crimps that are alternately deeper and shallower, and other special crimps.

The wire guiding means 26 is best shown in FIGS. 4 and 5. The same comprises a two-part bracket 87 with one part 88 adjustably affixed by screws 89 to the front top of the base 15, and a second part 90 vertically adjustable on the part 88 and secured thereto, as adjusted, by a bolt 91. The adjustment is effected by a turnbuckle arrangement 92. The vertically adjustable part 90 mounts two vertically spaced rollers 93, the wire W passing between said rollers toward the crimping rolls. Said part is provided with a forward extension 94 that mounts two laterally spaced rollers 95, one of which may be adjusted relative to the other. The space between the rollers 95 is forward of and generally aligned with the space between rollers 93. This guiding space 96 is clearly shown in FIG. 5 and can be shifted, enlarged and/or reduced by adjusting the bracket part 88 laterally, the bracket part 90 vertically, and one of the rollers 95 relative to the other.

Since the wire W has a bow in it as it comes off the reel, the means 26 may be adjusted, as above, to cause the wire in the space betwen said means and where the crimping rolls engage the same, to straighten, since the rolls 63 and 74 are pulling the wire through the space 96 and, in the process, ironing or flattening the curve or bow in the wire. Thus, by the time the wire reaches crimping position, it is substantially straight and it is in this condition that it is crimped.

The mounting bracket 27 is fixedly secured to the rear wall 43 of the base 15. Said bracket includes a housing 97 that extends upward in the line or path of travel of the crimped wire which enters and passes rearwardly through a rectangular space 98 between the side walls 99 of the housing. The bracket 27 extends towards the left, as viewed in FIG. 1, and at its left end is formed with a vertical wall 100. It is between the housing 97 and said wall 100 that part of the cutter drive 28 is located, the other part of said drive extending from the housing 97 on the opposite side thereof. The cutter means 31 is located in the space 98.

Said cutter drive 28 is driven by the output shaft 101 of a gear box 102, said shaft extending through and being journaled in a bearing 103 (FIG. 10) of the wall 100. Said drive 28 is shown with a flywheel 104 fixed on shaft 101, the previously mentioned single-revolution clutch 29 that, when released, produces rotation of a shaft 105 that is mounted in bearings 106 in the housing walls 99. One clutch part 107 is affixed to the shaft 101 and is continuously driven. The other clutch part 108 is rotatively connected to the driven shaft 105.

Normally, the clutch part 108 is held against rotation by a dog 109 mounted on a pivot 110 on the bracket 27 and biased by a spring 111 against the involute peripheral face of a stop cam 112. Said face has a radial abutment 113 which, when intercepted by the upper end of the dog 109, prevents rotation of the clutch part 108 while the part 107 continues to rotate. The cam 112 is loose on the shaft 105, a spring 114 connecting said cam and a flange or collar 115 that is fixed to the latter shaft.

When the dog 109 is retracted to free the abutment 113, the clutching engagement of the clutch parts 107 and 108 will cause rotation of shaft 105 and the flange 115 affixed thereto. The flange, by means of the spring 114, will turn the cam 112, bringing the abutment 113 past the top end of the dog 109. Shaft 105 will continue its revolution until the abutment 113 encounters the dog 109, bringing the cam 112 to a stop. The mentioned brake means 35 will counteract the inertia of the shaft 115 and the parts mounted on and connected thereto.

The spring 14 is a conventional element of a one-revolution roller clutch, such as clutch 29. The same is extended before the dog 109 releases the abutment 113 of the cam 112, causing energization of the operation of the means 31 due to the increased inertia imparted by said spring 14 on the cutter units 116 and 117.

The cutter means 31 comprises a cutter unit 116 on the driven shaft 105 and a second cutter unit 117 on a jack shaft 118 above and parallel to the shaft, the latter shaft being journalled in bearings 119 on the walls 99 of the housing 97. The shafts 105 and 118 are connected by equal gears 120 so they will turn together at the same speed but in opposite directions, as shown by the arrow 121 in FIG. 7, the direction being such that the cutter blades 122 of said units 116 and 117 approach each other at the near side of the crimped wire, the cutting edges 123 approaching aligned cutting relation before they reach a dead center position and, at dead center, cutting through the wire. Since the wire is continuously traveling according to the arrow 124, with the cutter blades 122 moving in the same direction, before the blades separate after the cut, they stay ahead of the end of the oncoming wire, thereby obviating buckling thereof.

The driving connection 32 is best seen in FIG. 1 and comprises a grooved pulley 125 on the shaft extension 52, a grooved pulley 126 on the input shaft 127 of the gear box or transmission 102, and suitable belting 128 trained over said pulleys to effect a drive from shaft 52 to shaft 127 and through the gearing in the box 102 to the output shaft 101. Regardless of the ratio between the speeds of shafts 52 and 101, the same is constant, i.e., it will not vary unless changes are made in the pulley and gear sizes of this drive.

The means 33 for effecting release of the clutch controlled drive to the cutter means 31 is partly shown in FIG. 10 and partly in FIGS. 1 and 7. Said means comprises a bracket 129 mounted on the gear box 102; a unit 130 on said bracket to change or vary the speed of its output shaft 131 relative to its input shaft 132 and provided with a regulator or adjuster 133 for effecting such change; means, shown as a chain and sprocket drive 34, that connects the input shaft 127 of the gear box 102 and the input shaft 132 of the unit 130; a switch-closing actuator 135 rotational with the output shaft 131 of said unit; a normally-open switch 136 that is momentarily closed by by said actuator 135; a solenoid 137 (FIGS. 1 and 7) mounted on a rearward extension 138 of the bracket 27 and which is in electric circuit with said switch 136, said solenoid having a retractable armature 139 that, when the solenoid is energized, retracts the dog 109 by means of links 140. This retraction is against the bias of the light spring 111 which projects said dog 109 into contact with the periphery of cam 112 upon de-energization of solenoid 137.

The adjuster 133 is shown in FIG. 10 as an arm 141 on a speed adjuster shaft 142 of unit 130, a sector plate 143 which is provided on the face opposite to the one shown with graduations that guide setting of said arm 141 according to the desired speed ratio between the shafts 131 and 132 of said unit 130. A lever-type handle 144 is used to loosen and tighten the index end of said arm 141 as adjusted in slot 145.

It will be clear that each time the actuator 135 closes switch 136, the solenoid 137 is energized to retract the dog 109 so the drive shaft 101, by means of the clutch 28, causes a one-revolution operation of the cutter means 31. Since the engagement of actuator 135 with the switch 136 is momentary, said switch will open immediately but not before the dog 109 is retracted and drive of the cutter means 31 instituted. The gear-connected shafts 105 and 118 thus set into rotation will continue until the abutment 113 of the cam 112 encounters the end of the re-projected dog 109, stopping the cutter dies 116 and 117 in spaced relation, leaving a clear path of the crimped wire, as the same feeds to its new position to be again cut.

Since the crimper rolls and the shaft 101 have constant speeds, as does the drive 34 to the input shaft 132 of the unit 130, the adjustment of the means 141 will control the timing of one revolution of the output shaft 131 of said unit 130, thereby controlling the length L of the crimped wire. The unit 130, however, can be adjusted by the means 141 with prescribed limits. The described means can be set to cut wire to lengths in the shorter range.

The means 33 is provided with a second switch 146 that is connected to the solenoid 137 in parallel with the switch 136. A selective switch (not shown) may connect either switch 136 or switch 146 to the solenoid 137. When the switch 146 is so connected, it controls energization of solenoid 137 by an actuator 147 on a jack shaft 148 that is driven at a slower speed than shaft 131 by a speed-reduction chain and sprocket drive 149 between said shafts 131 and 148. Both actuators 135 and 147 turn at speeds initially set for shaft 131 by the means 141. The actuator 147 is slower than actuator 131 according to the reduction of the drive 149. Thus, the crimped wire is cut to lengths in the longer range when the switch 146 is connected in the solenoid circuit.

The brake means 35, at all times, imposes a drag on the die cutter means. This friction is less than that of the clutch and will not interfere with cutter operation. Said means lessens the shock forces generated when the abutment 113 encounters the dog 109, the same comprising braking pads 150 applied to the opposite faces of a disc 151 on the shaft 118. These pads are housed in brackets 152 that are mounted on the under face of a catch-all tray 153 that is mounted on top of the housing 97. The friction of these pad 150 on the disc 151 may be varied by a pressure screw 154 applied to at least one of them, thus enabling cutting operation as desired. Heating of disc 151 under friction with the brake pads may be dissipated by a series of holes 155 in the disc.

The wire-guiding means 36 is adjustably secured to the forward face of the housing 97 toward the front of the machine, as shown in FIGS. 1 and 7. The same is best seen in FIGS. 7, 8 and 9 and comprises a support wall 156 on which is provided a collar 157 that extends toward the cutter means 31, and a conically flared extension 158 aligned with said collar and extending oppositely. A central bore 159 extends through said collar and flared extension. As shown in FIG. 6, said bore 159 is disposed in aligned relation to the cutting edges of the blades 122 when the same are engaged in a cutting operation. A bushing 160 is fitted in the bore 159 and rotatively adjustable therein and secured in such adjustment by a set screw 161. A passage 162 in said bushing is formed to freely pass a crimped wire, the elongated form of said passage, as in FIG. 8, assuring that the crimps are retained in a horizontal plane and are in such plane when the blades 122 cut through the wire.

When two wires, one above the other, are fed to the machine and are simultaneously similarly crimped between the rolls 63 and 74, the crimped wires cannot be properly cut by the cutter means 31 if the feed is continued with the crimped wires one above the other. Therefore, as shown in FIG. 9, the bushing 160 is provided with a rectangular passage 162a of a size to accommodate both wires. By locking said bushing in such rotated position, as in FIG. 9 for instance, the two crimped wires are in an offset relation as they leave the passage 162a and approach the point of cut. When the cutting edges of the blades 122 first engage the wires, they will press the wires toward each other. But, since the same are angularly offset, as mentioned, the wires will slide apart in opposite directions so as to be side-by-side when the cut is made.

The wire-holding guide 37 is mounted on the rear face of the housing 97, as shown in FIGS. 1 and 7. Said guide comprises a support wall 163 on which is provided angularly converging guide walls 164 and 165 that extend rearwardly from the wall 163. The walls form a converging feed throat 166 into which the ends of the wires W, before they are cut into lengths L, feed. Said throat has an exit opening 167. A throat-constricting plate 168 is mounted on a pivot 169 and is disposed beneath the guide wall 164. An adjusting screw 169a, carried by wall 164, is directed to press the rearward edge portion of plate 168 toward the rearward edge portion of guide wall 165. Said edge portions form a constricted passage for the wires of a size according to the adjustment of plate 168.

In practice, the travel of the wire W through the crimping rolls 22 and 23 and while being cut between the blades is such as to impart impetus to the cut length L. The same pass through the throat 167, as thus propelled. A collecting receptacle has a rear wall that intercepts said wire lengths L which drop into the receptacle.

The guide 37 need not be horizontally adjustable since the width of the throat 166 may be quite large to accommodate crimped wires cut by the blades 122 anywhere along their widths. However, the guide means 36 is provided with lateral adjustment because of the variation of the line of wire feed by crimping rolls of different diameters. To this end, a bracket 170 is mounted on the rear of the base 15, an adjusting screw extending therethrough and engaged in an elongated sleeve 172 attached to the wall 156 of the guide 37. Screws 173 in horizontal slots in said wall, when loosened, allow lateral adjustment of the guide to align with the line of feed of the wire. Said screws, when tightened, lock the guide in place.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. A wire-crimping machine comprising:
   (a) two vertical shafts each moutning a crimping roll,
   (b) one shaft and the crimping roll thereon being mounted to turn on a fixed axis,
   (c) means mounting the other shaft and the crimping roll thereon for adjustment toward and from the first shaft and roll,
   (d) a worm wheel on each said shaft, one being pitched on the opposite hand to the other,
   (e) a single driven horizontal shaft provided with a worm in driving mesh with one of the worm wheels, and with a second worm in driving mesh with the other worm wheel, thereby to drive the crimping rolls oppositely in wire-crimping relation,
   (f) the worm wheel on the adjustable shaft retaining meshing engagement with said other worm and turning on the axis of said shaft during adjustment, the crimping roll on the latter shaft thereby turning relative to the crimping roll on the shaft on the fixed axis,
   (g) means to rotationally adjust the roll on the adjustable shaft to orient the same with the roll on the fixed shaft,
   (h) the two crimping rolls being provided with interlacing crimping dies that form crimps in the wire and which are disposed in a horizontal plane,
   (i) means to cut the crimped wires to uniform lengths and comprising opposite shear-cutting, rotationally-mounted dies that engage the wire on opposite sides thereof, one die above and one below the horizontal plane of the crimped wire, and
   (j) means to drive the dies in opposite directions to move the shearing edges thereof, during cutting of the wire, in the direction of movement of the wire.

2. A wire-crimping machine comprising:
   (a) a base of parallelepiped form having top and bottom horizontal walls of which the latter is substantially lower than table height,
   (b) wire-guiding and -crimping means mounted on said base and including two horizontal crimping rolls in horizontal disposition above the top base wall,
   (c) means to drive said rolls to crimp and feed a wire horizontally above the top base wall with the crimp formed in a horizontal plane,
   (d) means to cut the crimped wire to uniform lengths and carried by the base and located rearwardly of the base mainly above the base top, said means comprising opposite shear-cutting, rotationally-mounted dies that engage the wire on opposite sides thereof, one die above and one below the horizontal plane of the crimped wire,
   (e) means to drive the dies in opposite directions to move the shearing edge thereof, during cutting of the wire, in the direction of movement of the wire,
   (f) a prime mover located laterally of the base and having a clutch-controlled drive shaft extending into the base to drive the wire-crimping means,
   (g) a clutch-controlled one-revolution drive to operate the cutting means parallel to the mentioned drive shaft,
   (h) a take-off driving connection between said shafts, and (i) revolution-proportioned means driven by said connection and controlling the one-revolution clutch.

3. A machine for crimping wires and cutting them into lengths, comprising:
   (a) a hollow base of parallelepiped form,
   (b) a lateral extension from one side of the lower portion of said base,
   (c) an electric motor mounted on the end of said extension,
   (d) a clutch-controlled drive extending from the output shaft to the base and including a worm shaft provided with longitudinally spaced worms, one right-hand and the other left-hand, and extending into the hollow of the base toward the opposite side of the base,
   (e) two crimping units journalled in said base in driving engagement with said worms,
   (f) each unit being provided with a crimping roll located above the top surface of the base,
   (g) means to adjust one unit relative to the other while the driving engagement of both crimping units is retained,
   (h) means to rotationally adjust one of the crimping rolls relative to the other to orient the crimping portions of said rolls for crimping wire,
   (i) a take-off drive from said worm shaft and extending rearwardly,
   (j) a clutch-controlled one-revolution drive driven by the take-off drive,
   (k) means controlled by said take-off drive to release the clutch elements for operation of the output shaft of the one-revolution drive,
   (l) means to cut the crimped wire to uniform lengths each time the output shaft is released for rotation, said means comprising opposite shear-cutting, rotationally-mounted dies that engage the wire on opposite sides thereof, one die above and one below the horizontal plane of the crimped wire, and
   (m) means to drive the dies in opposite directions to move the shearing edges thereof, during cutting of the wire, in the direction of movement of the wire.

4. A machine according to claim 3 in which a movable dog is normally engaged with the mentioned output shaft to hold the same against rotation, and the means controlled by the take-off drive includes an actuator to retract said dog and release the output shaft.

5. A machine according to claim 4 in which a rotation-proportioning device is included in the means controlled by the take-off drive, the dog-retracting actuator being driven by the output of said device.

6. A machine according to claim 5 provided with a second dog-retracting actuator driven by the output of said device at a reduced rate of speed, the two actuators being selectively connected to effect retraction of the dog according to the difference of speed between said actuators.

7. A machine according to claim 3 in which a wire guide is disposed between the crimping rolls and the shear-cutting dies to turn the wire to a plane at an angle to the horizontal, whereby two wires, one above the other and simultaneously crimped between the crimping rolls, are angularly offset and will slide oppositely, when engaged by and between the cutting dies, to assume side-by-side positions during shear-cutting.

8. In a machine for crimping and cutting two wires disposed one above the other in a horizontal path with the crimps in the wires lying in a horizontal plane,
   (a) a pair of rotatable cutters having cutting blades with edges that are horizontal and transverse to the path of feed of the wires, and
   (b) guide means interposed between the crimping means and said cutters to turn the two wires so that their crimps are at an angle to the horizontal and the wires are laterally offset from each other, the offset wires, upon engagement between the cutting blade edges and before shearing takes place, being slid by the cutter blades oppositely to assume side-by-side positions between said blades during subsequent shear-cutting thereof.

9. A wire-crimping machine comprising:
   (a) two vertical shafts each mounting a crimping roll,
   (b) one shaft and the crimping roll thereon being mounted to turn on a fixed axis,
   (c) means mounting the other shaft and the crimping roll thereon for adjustment toward and from the first shaft and roll,
   (d) a worm wheel on each said shaft, one being pitched on the opposite hand to the other,
   (e) a single driven horizontal shaft provided with a worm in driving mesh with one of the worm wheels, and with a second worm in driving mesh with the other worm wheel, thereby to drive the crimping rolls oppositely in wire-crimping relation,
   (f) the worm wheel on the adjustable shaft retaining meshing engagement with said other worm and turning on the axis of said shaft during adjustment, the crimping roll on the latter shaft thereby turning relative to the crimping roll on the shaft on the fixed axis,
   (g) means to rotationally adjust the roll on the adjustable shaft to orient the same with the roll on the fixed shaft,
   (h) the two rolls being provided with interlacing crimping dies that form crimps in the wire that are in a horizontal plane,
   (i) means to cut the crimped wires to uniform lengths,
   (j) said latter means comprising opposite shear-cutting dies that engage the wire on opposite sides thereof, one above and one below the horizontal plane of the wire, and
   (k) a wire guide disposed between the crimping rolls and the shear-cutting dies to turn the wire to a plane at an angle to the horizontal, whereby two wires, one above the other and simultaneously crimped between the crimping rolls, are angularly offset and will slide oppositely, when engaged by and between the cutting dies, to assume side-by-side positions during shear-cutting.

References Cited
UNITED STATES PATENTS

| | | | |
|---|---|---|---|
| 627,200 | 6/1899 | Neracher | 72—185 |
| 2,188,406 | 1/1940 | Horton | 72—338 |
| 2,538,644 | 1/1951 | Guess | 72—196 |
| 3,044,501 | 7/1962 | Govea | 72—195 |

RICHARD J. HERBST, *Primary Examiner.*

L. A. LARSON, *Assistant Examiner.*